(12) United States Patent
Harada et al.

(10) Patent No.: US 8,711,992 B2
(45) Date of Patent: Apr. 29, 2014

(54) PHASE NOISE EXTRACTION APPARATUS AND TECHNIQUE

(75) Inventors: Koji Harada, Hyogo (JP); Mitsuru Yokoyama, Kobe (JP)

(73) Assignee: Agilent Technologies, Inc., Santa Clara, CA (US)

( * ) Notice: Subject to any disclaimer, the term of this patent is extended or adjusted under 35 U.S.C. 154(b) by 138 days.

(21) Appl. No.: 13/484,856

(22) Filed: May 31, 2012

(65) Prior Publication Data

US 2013/0322570 A1    Dec. 5, 2013

(51) Int. Cl.
*H04L 27/06*      (2006.01)
*H03D 1/00*      (2006.01)

(52) U.S. Cl.
USPC .............................. 375/343; 375/340; 708/422

(58) Field of Classification Search
USPC ........................................................ 375/343
See application file for complete search history.

(56) References Cited

U.S. PATENT DOCUMENTS

| | | | |
|---|---|---|---|
| 5,412,325 A | | 5/1995 | Meyers |
| 7,295,937 B2 * | | 11/2007 | Dutta et al. ..................... 702/69 |
| 2002/0036713 A1 * | | 3/2002 | Zhang et al. .................. 348/607 |
| 2005/0245196 A1 | | 11/2005 | Diaz Fuente et al. |
| 2006/0195501 A1 | | 8/2006 | Feldhaus et al. |
| 2007/0279057 A1 * | | 12/2007 | Rudakov et al. .............. 324/314 |
| 2011/0148676 A1 * | | 6/2011 | Waheed et al. ................ 341/131 |

OTHER PUBLICATIONS

Jones, et al. "Differential Detection of MSK in a Dispersive Channel and Correlated Noise", Hewlett-Packard Laboratories, Filton Road, Stoke Gifford, Bristol BS34 8QZ, United Kingdom, Jul. 15, 1999.
Martinez-Rodriguez, et al. "A general solution to the continuous-time estimation problem under widely linear processing", EURASIP Journal on Advances in Signal Processing 2011, 2011:119.

* cited by examiner

*Primary Examiner* — Erin File

(57) ABSTRACT

A phase noise extraction apparatus and technique that extracts phase noise induced by a component of a transmitter from a radio frequency (RF) signal and attenuates noise induced from other sources. The RF signal is digitized, modulation is removed, and the carrier is suppressed to provide a noise signal including the phase noise and the noise induced from the other sources. A complementary autocorrelation operation is applied to the noise signal to attenuate the noise from the other sources. The correlated signal is transformed into the frequency domain to generate a power spectrum of the phase noise that may be measured or displayed.

23 Claims, 5 Drawing Sheets

PHASE NOISE EXTRACTION APPARATUS AND TECHNIQUE

BACKGROUND

Existing phase noise measurement techniques typically provide an aggregate measurement of so-called pure phase noise and phase noise from other sources induced on a radio frequency (RF) signal. The pure phase noise may be induced by components of a transmitter, such as an oscillator for example. The phase noise from other sources may originate from complex valued noise sources, and may include thermal noise, or various kinds of modulation-induced and synchronization-induced noise signals which may originate from a transmission filter, a non-ideal IQ modulator or timing uncertainty. It has been commonly accepted in the industry that pure phase noise and other phase noise induced on an RF signal can not be distinguished from each other, and generally can not be measured individually.

In the field of telecommunications, there is a need to measure phase noise induced by transmitters on complex digitally modulated signals such as wideband code division multiple access (WCDMA) and orthogonal frequency-division multiplexing (OFDM) signals including wireless local area network (LAN) signals and long term evolution (LIE) signals, as a way of testing the transmitters. However, such phase noise from the various other sources may mask the pure phase noise that is of interest for measurement. Existing phase noise measurement techniques typically do not have the ability to separately and accurately measure pure phase noise induced on RE signals.

There is therefore a need to provide improved phase noise extraction apparatuses and techniques that can distinguish between various types of phase noise and provide accurate measurement of pure phase noise.

SUMMARY

In a representative embodiment, a method includes digitizing a radio frequency (RF) signal that includes phase noise and secondary noise; removing, modulation and suppressing a carrier represented in the digitized signal to provide a composite noise signal including the phase noise and the secondary noise; applying a complementary autocorrelation on the composite noise signal to attenuate the secondary noise and provide a correlated noise signal substantially without the secondary noise; and representing a power spectrum of the phase noise responsive to the correlated noise signal.

In a farther representative embodiment, an apparatus includes a converter configured to digitize a radio frequency (RF) signal that includes phase noise and secondary noise; a processing unit configured to remove modulation and suppress a carrier represented in the digitized signal to provide a composite noise signal including the phase noise and the secondary noise; a correlator configured to apply a complementary autocorrelation on the composite noise signal to attenuate the secondary noise and to provide a correlated noise signal substantially without the secondary noise; and a generator configured to represent a power spectrum of the phase noise responsive to the correlated noise signal.

In a further representative embodiment, a non-transitory computer readable medium that stores a program executable by a computer for extracting phase noise from a radio frequency (RF) signal, the computer readable medium including a first code segment for digitizing the RF signal that includes the phase noise and secondary noise; a second code segment for removing modulation and suppressing a carrier represented in the digitized signal to provide a composite noise signal including the phase noise and the secondary noise; a third code segment for applying a complementary autocorrelation on the composite noise signal to attenuate the secondary noise and provide a composite noise signal substantially without the secondary noise; and a fourth code segment for representing a power spectrum of the phase noise responsive to the correlated noise signal.

In a further representative embodiment, an apparatus includes a converter configured to digitize a first radio frequency (RF) signal and a second RF signal that both include phase noise and secondary noise; a processing unit configured to remove modulation and suppress carriers represented in the first and second digitized signals to respectively provide a first composite noise signal and a second composite noise signal both including the phase noise and the secondary noise; a correlator configured to apply a complementary cross-correlation on the first and second composite noise signals to attenuated the secondary noise and provide a correlated noise signal substantially without the secondary noise; and a generator configured to represent a power spectrum of the phase noise responsive to the correlated noise signal.

In a still further representative embodiment, a method includes digitizing a radio frequency (RF) that includes amplitude noise and secondary noise; removing modulation and suppressing a carrier represented in the digitized signal to provide a composite noise signal including the amplitude noise and the secondary noise; applying a complementary autocorrelation on the composite noise signal to attenuate the secondary noise and provide a correlated noise signal substantially without the secondary noise; and representing a power spectrum of the amplitude noise responsive to the correlated noise signal.

BRIEF DESCRIPTION OF THE DRAWINGS

The illustrative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that, other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Figure 1:
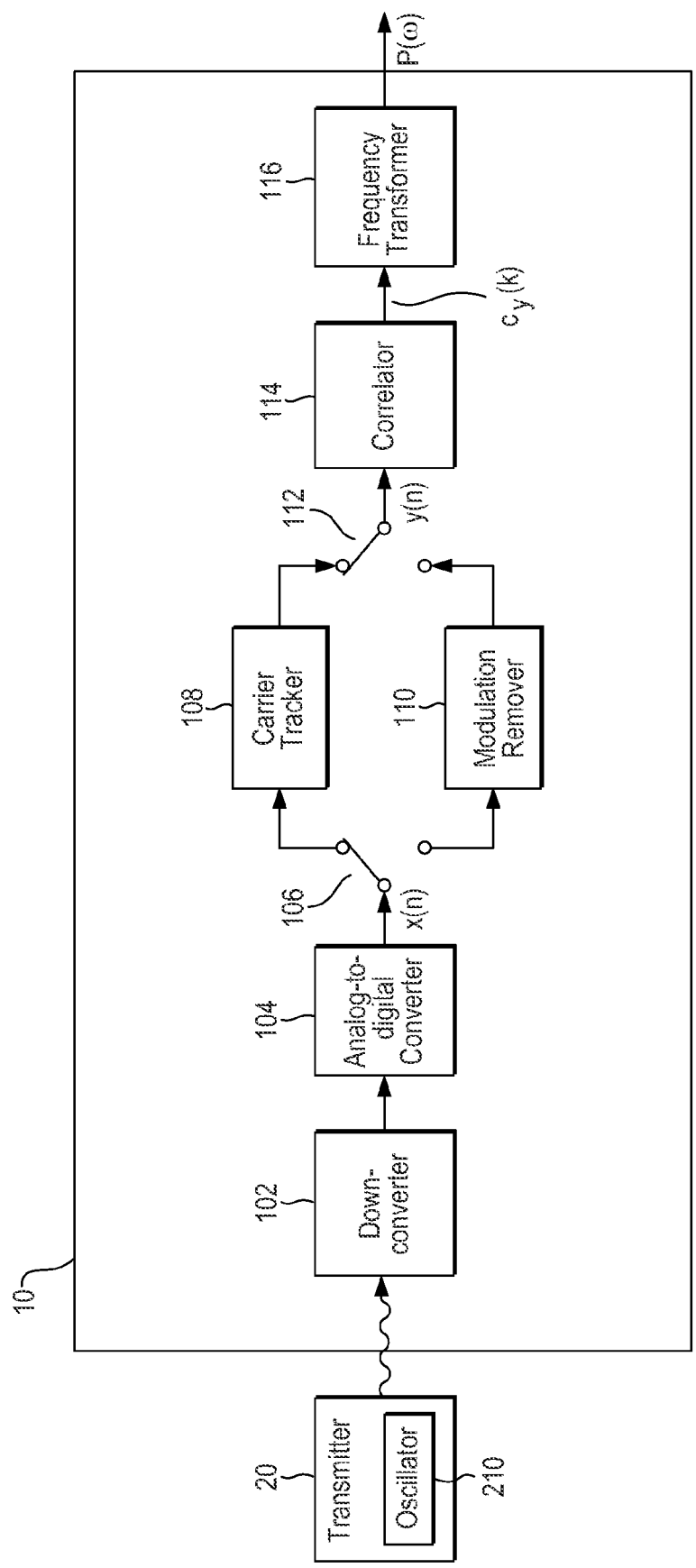
FIG. 1 is a block diagram illustrating a phase noise extractor 10, according to a representative embodiment.

FIG. 1 is a block diagram illustrating a phase noise extractor 10, according to a representative embodiment. In FIG. 1, phase noise extractor 10 receives a radio frequency (RF) signal from transmitter 20. Transmitter 20 may include various transmitter components such as oscillator 210, and may transmit any of various digitally modulated signals such as wideband code division multiple access (WCDMA) and orthogonal frequency-division multiplexing (OFDM) signals including wireless local area network (LAN) signals and long term evolution (LTE) signals. The RF signal may be transmitted from transmitter 20 without modulation. Phase noise extractor 10 may be a component of a receiver (not shown) such as a radio, mobile telephone, etc., or a component of an analyzer or a tester. The RF signal may include phase noise induced by a component 210 of transmitter 20, and secondary noise induced by a source or sources other than component 210. In this representative embodiment, component 210 of transmitter 20 is an oscillator, and may hereinafter be referred to as oscillator 210. The phase noise may also be induced at transmitter 20 by instability of the time base, phase jitter in clock pulses of digital-to-analog converters and or phase-lock loops. The secondary noise may be characterized as complex-valued noise, and may be induced at transmitter 20, induced at the receiver (not shown) or induced during transmission. The secondary noise may include thermal noise, additive spurious signals, or modulation-induced noise. The secondary noise induced on the RF signal at transmitter 20 may be caused by a non-ideal passband response of an intermediate frequency stage such as a non-flat amplitude response and/or a non-linear phase response, finite impulse response (FIR) filter truncation, IQ gain imbalance, IQ quadrature skew and IQ origin offset, for example. The secondary noise induced at the receiver may include synchronization-induced noise, which may be caused by timing misalignment for example.

As shown in FIG. 1, the RF signal from transmitter 20 is applied to down-converter 102, which down-converts the RF signal in frequency to baseband or to an intermediate frequency sufficient for an analog-to-digital converter (ADC). The baseband or IF signal from down-converter 102 is applied to analog-to-digital converter (ADC) 104, which samples the baseband signal to provide a discrete-time sequence (digitized signal) x(n). If the RF signal from transmitter 20 is modulated, switch 106 is switched to connect the digitized signal x(n) output from ADC 104 to modulation remover 110. Modulation remover 110 removes the modulation from the carrier of digitized signal x(n) and suppresses the carrier, to provide a composite noise signal y(n), the composite noise signal y(n) including the phase noise and the secondary noise.

Figure 2:
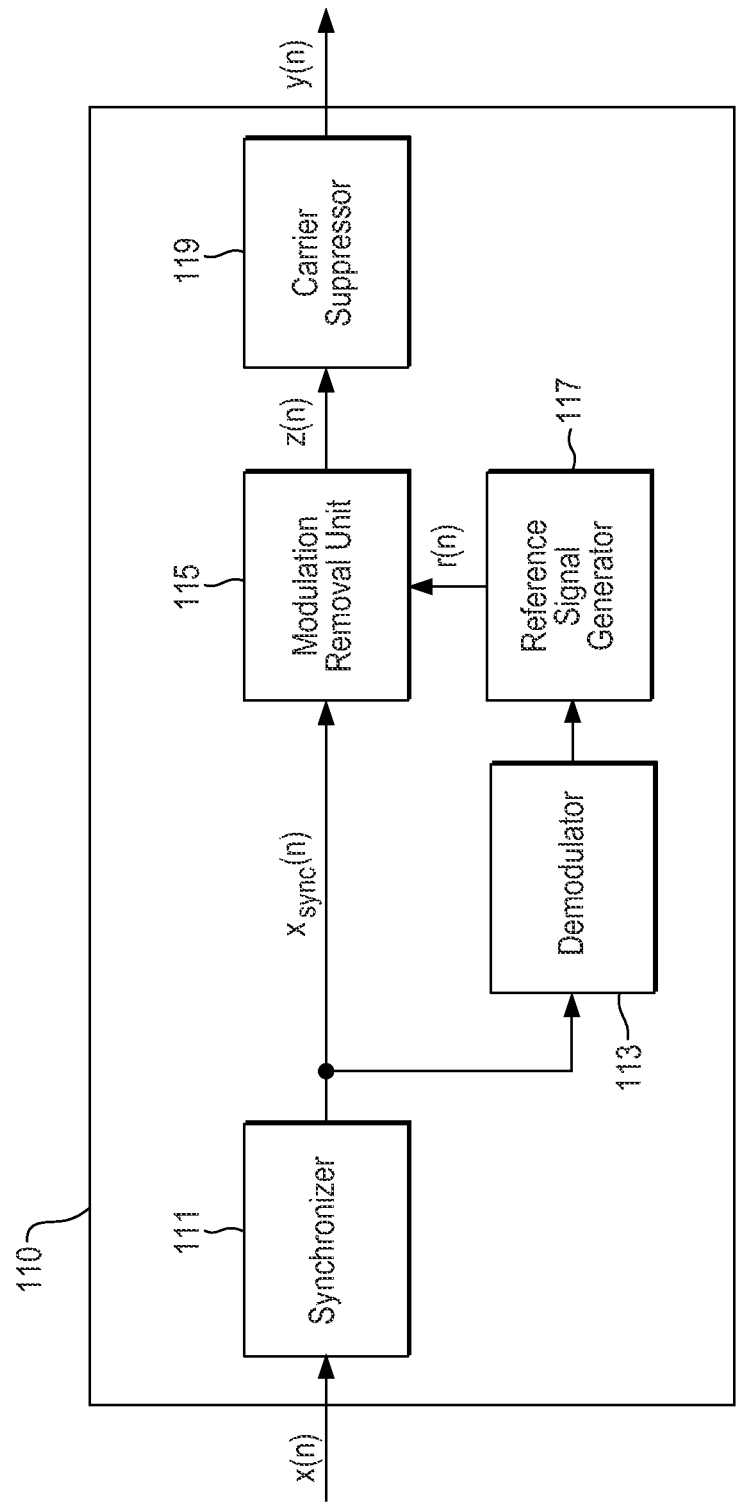
FIG. 2 is a block diagram illustrating a modulation remover 110, according to a representative embodiment.

FIG. 2 is a block diagram illustrating modulation remover 110 according to a representative embodiment. As shown in FIG. 2, modulation remover 110 may include synchronizer 111, demodulator 113, modulation removal unit 115, reference signal generator 117 and carrier suppressor 119. Synchronizer 111 synchronizes digitized signal x(n) with the internal timebase in terms of carrier frequency and decision timing to enable coherent processing, and produces synchronized signal x(n), which is the synchronized version of digitized signal x(n). In addition, depending on the type of modulation on digitized signal x(n), further processing may be performed, such as unscrambling, matched filtering, channel equalization, extraction of useful parts of the signal, and estimation/compensation of multipath fading channels and/or IQ impairments. Demodulator 113 demodulates the synchronized signal $x_{sync}(n)$ to recover information bits. Reference signal generator 117 constructs the reference signal r(n), which is the ideal version of digitized signal x(n), by remodulating the information bits. Responsive to reference signal r(n) provided by reference signal generator 117, modulation removal unit 115 removes the modulation from the synchronized signal $x_{sync}(n)$ to provide a carrier signal z(n) including the phase noise and the secondary noise, without the modulation. In an embodiment, modulation removal unit 115 divides synchronized signal $x_{sync}(n)$ by reference signal r(n) to provide carrier signal z(n) including the phase noise and the secondary noise, without modulation. Carrier suppressor 119 subsequently suppresses the carrier from the output of modulation removal unit 115 to provide composite noise signal y(n) including the phase noise and the secondary noise.

In an embodiment, synchronization may be achieved by synchronizer 111 of modulation remover 110 by utilizing known parts of digitized signal x(n), such as a pilot, preamble, midamble, or training sequence, depending on the specific format of digitized signal x(n). Alternatively, synchronization may be achieved by blind synchronization techniques that do not depend on such known signal parts. If digitized signal x(n) consists of only known parts, demodulator 113 of modulation remover 110 may be excluded. For improved synchronization performance, some of the blocks within modulation remover 110 may be repeated. For example, since reference signal r(n) can be considered as a known part of digitized signal x(n), a second synchronizer that is responsive to reference signal r(n) may be included to improve synchronization performance. With the modulation removed and the carrier suppressed, composite noise signal y(n) as output from modulation remover 110 includes substantially only the phase noise induced by oscillator 210 and the secondary noise. If the RF signal from transmitter 20 is not modulated, switch 106 is switched to connect digitized signal x(n) output from ADC 104 to carrier tracker 108. Carrier tracker 108 tracks and suppresses the carrier of digitized signal x(n), to provide composite noise signal y(n) which includes substantially only the phase noise induced by oscillator 210 and the secondary noise. The aforementioned synchronization-induced noise previously identified as an example of the secondary noise may be induced during removal of the modulation and/or suppression of the carrier by modulation remover 110 and carrier tracker 108. Modulation remover 110 and carrier tracker 108 may collectively be characterized as a processing unit.

As an example, in the case where the secondary noise induced from other sources consists only of thermal noise, digitized signal x(n) may be represented as $$x(n)=s(n)e^{j\theta(n)}+v(n) \quad (1),$$

where s(n) is a zero-mean, randomly-modulated baseband signal for the modulated signal case and s(n)=1 for the unmodulated case, θ(n) is pure phase noise (real-valued), v(n) is thermal noise (complex-valued), $j=\sqrt{-1}$ and e is the base of the natural logarithm. Under the reasonable assumption that |θ(n)| sufficiently small, composite noise signal y(n) for n for which s(n)≠0 may be represented as $$y(n)=x(n)/s(n)-1 \approx j\theta(n)+v'(n) \quad (2),$$

where v'(n)=v(n)/s(n) is an altered secondary noise signal which may be referred to as the secondary noise Switch 112 as shown in FIG. 1 may be switched to provide composite noise signal y(n) from modulation remover 110 to correlator 114 when the RF signal is modulated, and to provide composite noise signal y(n) from carrier tracker 108 to correlator 114 when the RF signal is not modulated. Correlator 114 performs complementary autocorrelation on composite noise signal y(n). The complementary autocorrelation as applied on composite noise signal y(n) may be defined as $$c_y(k)=E[y(n)y(n-k)] \quad (3),$$

wherein E[·] represents the mathematical expectation and k is a time lag variable between respective samples of composite noise signal y(n). As a consequence of the statistical properties of the complementary autocorrelation, the secondary noise is attenuated or suppressed, so that correlated noise signal $c_y(k)$ output from correlator 114 substantially retains or includes only the phase noise induced by oscillator 210 in transmitter 20 substantially without the secondary noise. Of note, the mathematical expectation E[·] may not be computed in finite time. Therefore, for a sequence u(n) with length (n=1, ..., N), the mathematical expectation may be approximated as $E[u(n)] \approx (1/N)\Sigma_{n=1}^{N}u(n)$.

As further shown in FIG. 1, correlated noise signal $c_y(k)$ from correlator 114 is output to frequency transformer (generator) 116, which transforms correlated noise signal $c_y(k)$ to the frequency domain, to provide a power spectrum P(ω) of phase noise induced on the RF signal by oscillator 210 of transmitter 20, substantially without the secondary noise. In a representative embodiment, frequency transformer 116 may be a Fourier transformer. In another representative embodiment, frequency transformer 116 may be a discrete Fourier transformer or a discrete-time Fourier transformer. The power spectrum P(ω) of phase noise may be subsequently measured, and/or output to a display (not shown) or provided as a printed hard copy to enable visualization of the phase noise induced by oscillator 210.

As described, phase noise extractor 10 may be disposed as a component of a receiver such as a radio, mobile telephone, etc., or a component of an analyzer or a tester. The various "parts" of phase noise extractor 10 shown in FIG. 1 may be physically implemented using a software-controlled microprocessor, hard-wired logic circuits, or a combination thereof. Although shown separately, the various "parts" may be implemented together.

Figure 3:
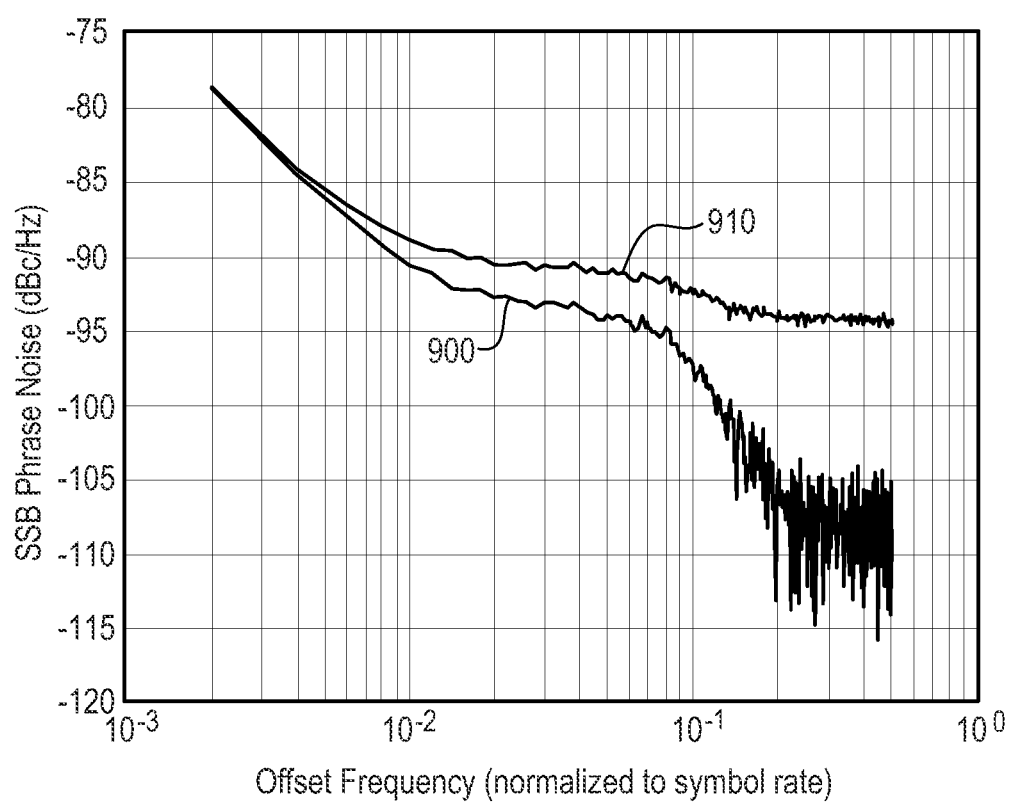
FIG. 3 is a graph illustrating phase noise power spectrum $P(\omega)$ extracted from an RF signal according to a representative embodiment, and a phase noise power spectrum including phase noise and noise from other sources.

FIG. 3 is a graph illustrating power spectrum P(ω) of phase noise extracted from an RF signal according to a representative embodiment (lower trace 900), and a phase noise power spectrum including phase noise and secondary noise from other sources (upper trace 910). Traces 900 and 910 were obtained from numerical simulation based on a synthetically generated Gaussian modulated signal x(n) with artificial phase noise and IQ impairments such as IQ gain imbalance, quadrature skew, and origin offset for example; linear distortion; and additive white Gaussian noise (AWGN). Trace 910 as shown includes the power spectrum of the phase noise induced by oscillator 210 of transmitter 20 described with respect to FIG. 1, in addition to the secondary noise. In contrast, trace 900 as shown includes the power spectrum of the phase noise induced by oscillator 210 of transmitter 20 described with respect to FIG. 1, substantially without the secondary noise. FIG. 3 demonstrates how the phase noise induced by oscillator 210 of transmitter 20, which typically would remain buried under noise introduced by a non-ideal IQ modulator having non-zero IQ imbalances, may be uncovered according to the representative embodiment described above. Of note, the rightmost portion of trace 900 includes remnants of complex-valued secondary noise that may be suppressed or attenuated more substantially as the number of signal samples of digitized signal x(n) is increased. The same attenuation effects have been verified on other kinds of secondary noise including but not limited to nonideal filtering, timing misalignment of digitally modulated signals, additive spurious signals, and additive colored noise. Incidentally, in trace 900 the complementary autocorrelation of complex-valued noise has larger peak-to-average ratio (PAR) than the PAR of the composite noise signal y(n) prior to autocorrelation.

Figure 4:
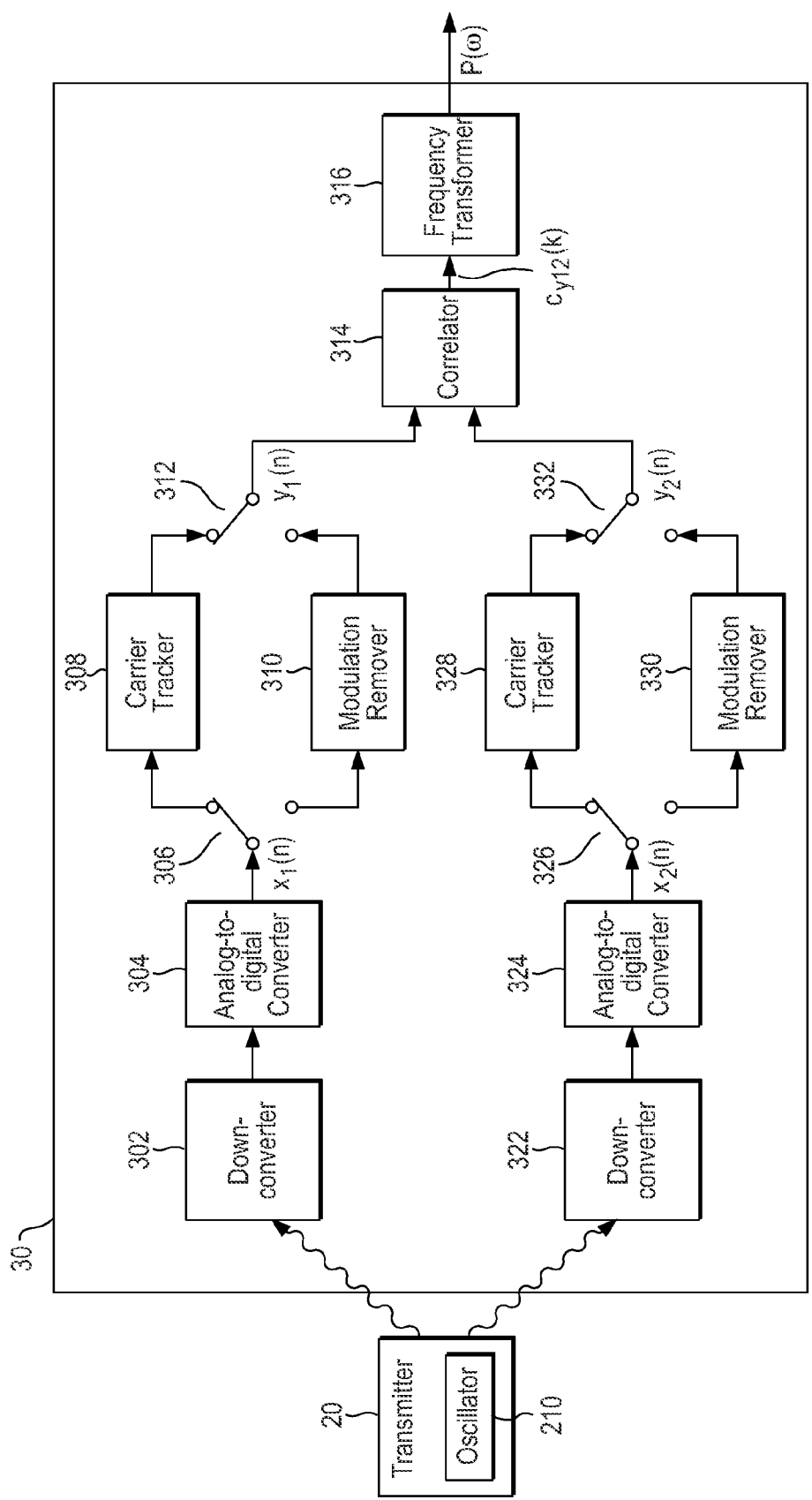
FIG. 4 is a block diagram illustrating a phase noise extractor 30, according to a representative embodiment.

FIG. 4 is a block diagram illustrating a phase noise extractor 30, according to a representative embodiment. Phase noise extractor 30 may include similar features as phase noise extractor 10 shown in FIG. 1, including somewhat similar references numerals. Detailed description of such similar features may be omitted from the following.

In FIG. 4, phase noise extractor 30 receives a first radio frequency (RF) signal and a second RF signal from transmitter 20. The first and second RF signals are nearly identical, and are received by phase noise extractor at substantially the same time. Transmitter 20 may include various transmitter components such as oscillator 210, and may transmit the first and second RF signals as any of various digitally modulated signals such as WCDMA, OFDM, wireless LAN and LTE. The first and second RF signals may be transmitted from transmitter 20 without modulation. Phase noise extractor 30 may be a component of a receiver (not shown) such as a radio, mobile telephone, etc., or a component of an analyzer or a tester. The first and second RF signals may include phase noise induced by a component of transmitter 20 such as oscillator 210, and secondary noise induced from other sources, similarly as described with respect to FIG. 1. In this representative embodiment, component 210 of transmitter 20 is an oscillator, and may hereinafter be referred to as oscillator 210.

As shown in FIG. 4, the first and second RF signals from transmitter 20 are respectively applied to down-converters 302 and 322, which down-convert the first and second RF signals in frequency to baseband or to an intermediate frequency sufficient for an ADC. The baseband or IF signals from down-converters 302 and 322 are respectively applied to ADCs 304 and 324, which sample the baseband or IF signals to provide respective discrete-time sequences (first and second digitized signals) $x_1(n)$ and $x_2(n)$. If the first and second RF signals from transmitter 20 are modulated, switch 306 is switched to connect first digitized signal $x_1(n)$ output from ADC 304 to modulation remover 310 and switch 326 may be switched to connect second digitized signal $x_2(n)$ output from ADC 324 to modulation remover 330. Modulation removers 310 and 330 remove the modulation from the carriers of first and second digitized signals $x_1(n)$ and $x_2(n)$ and suppress the carriers, to respectively provide first and second composite noise signals $y_1(n)$ and $y_2(n)$. With the modulation removed and the carrier suppressed, first and second composite noise signals $y_1(n)$ and $y_2(n)$ as output from modulation removers 310 and 330 include substantially only the phase noise induced by oscillator 210 and the secondary noise. If the first and second RF signals from transmitter 20 are not modulated, switch 306 is switched to connect first digitized signal $x(n)$ output from ADC 304 to carrier tracker 308, and switch 326 is switched to connect second digitized signal $x_2(n)$ output from ADC 324 to carrier tracker 328. Carrier trackers 308 and 328 track and suppress the carriers of first and second digitized signal $x_1(n)$ and $x_2(n)$, to respectively provide first and second composite noise signals $y_1(n)$ and $y_2(n)$ which include substantially only the phase noise induced by oscillator 210 and the secondary noise. The aforementioned synchronization-induced noise previously identified as an example of secondary noise may be induced during removal of the modulation and/or suppression of the carrier by modulation removers 310 and 330 and carrier trackers 308 and 328. Modulation removers 310 and 330 and carrier trackers 308 and 328 may collectively be characterized as a processing unit.

Switch 312 as shown in FIG. 4 may be switched to provide the first composite noise signal $y_1(n)$ from modulation remover 310 to correlator 314 when the first RF signal is modulated, and to provide first composite noise signal $y_1(n)$ from carrier tracker 308 to correlator 314 when the first RF signal is not modulated. In a similar manner, switch 332 may be switched to provide second composite noise signal $y_2(n)$ from modulation remover 330 to correlator 314 when the second RF signal is modulated, and to provide second composite noise signal $y_2(n)$ from carrier tracker 328 to correlator 314 when the second RF signal is not modulated.

Correlator 314 performs a complementary cross-correlation operation on noise signals $y_1(n)$ and $y_2(n)$. The complementary cross-correlation operation as applied on first and second composite noise signals $y_1(n)$ and $y_2(n)$ may be defined as $$c_{y12}(k) = E[y_1(n) y_2(n-k)] \quad (4),$$

wherein $E[\cdot]$ represents the mathematical expectation. As a consequence of the statistical properties of the complementary cross-correlation operation, the secondary noise is attenuated or suppressed, so that the correlated noise signal $c_{y12}(k)$ output from correlator 314 becomes identical to correlated noise signal $c_y(k)$ of equation (3), and thus substantially retains or includes only the phase noise induced by oscillator 210 in transmitter 20 substantially without the secondary noise. In this embodiment, the complementary cross-correlation operation performed by correlator 314 is limited as performed on pairs of first and second composite noise signals y1(n) and y2(n) provided responsive to first and second RE signals that are both respectively modulated, or both respectively non-modulated.

As further shown in FIG. 4, correlated noise signal $c_{y12}(k)$ from correlator 314, which is equal to correlated noise signal $c_y(k)$ as noted above, is output to frequency transformer (generator) 316, which transforms correlated noise signal $c_{y12}(k)$ to the frequency domain and provides a power spectrum. $P(\omega)$ of phase noise induced on the first and second RF signals by oscillator 210 of transmitter 20, substantially without the secondary noise. The power spectrum $P(\omega)$ of phase noise may be subsequently measured, and/or output to a display (not shown) or provided as a printed hard copy to enable visualization of the phase noise induced by oscillator 210. The two-path scheme of this embodiment as described with respect to FIG. 4 enables separation of the phase noise induced by oscillator 210 that commonly exists in both the first and second RF signals, from other noise that independently exists in the first and second RF signals, such as phase jitter of ADCs 304 and 324 and pure phase noise of local oscillators in down-converters 302 and 322.

In a similar manner as described with respect to FIG. 1, phase noise extractor 30 shown in FIG. 4 may be disposed as a component of a receiver such as a radio, mobile telephone, etc., or a component of an analyzer or a tester. The various "parts" of phase noise extractor 30 shown in FIG. 4 may be physically implemented using a software-controlled microprocessor, hard-wired logic circuits, or a combination thereof. Although shown separately, the various "parts" may be implemented together.

Figure 5:
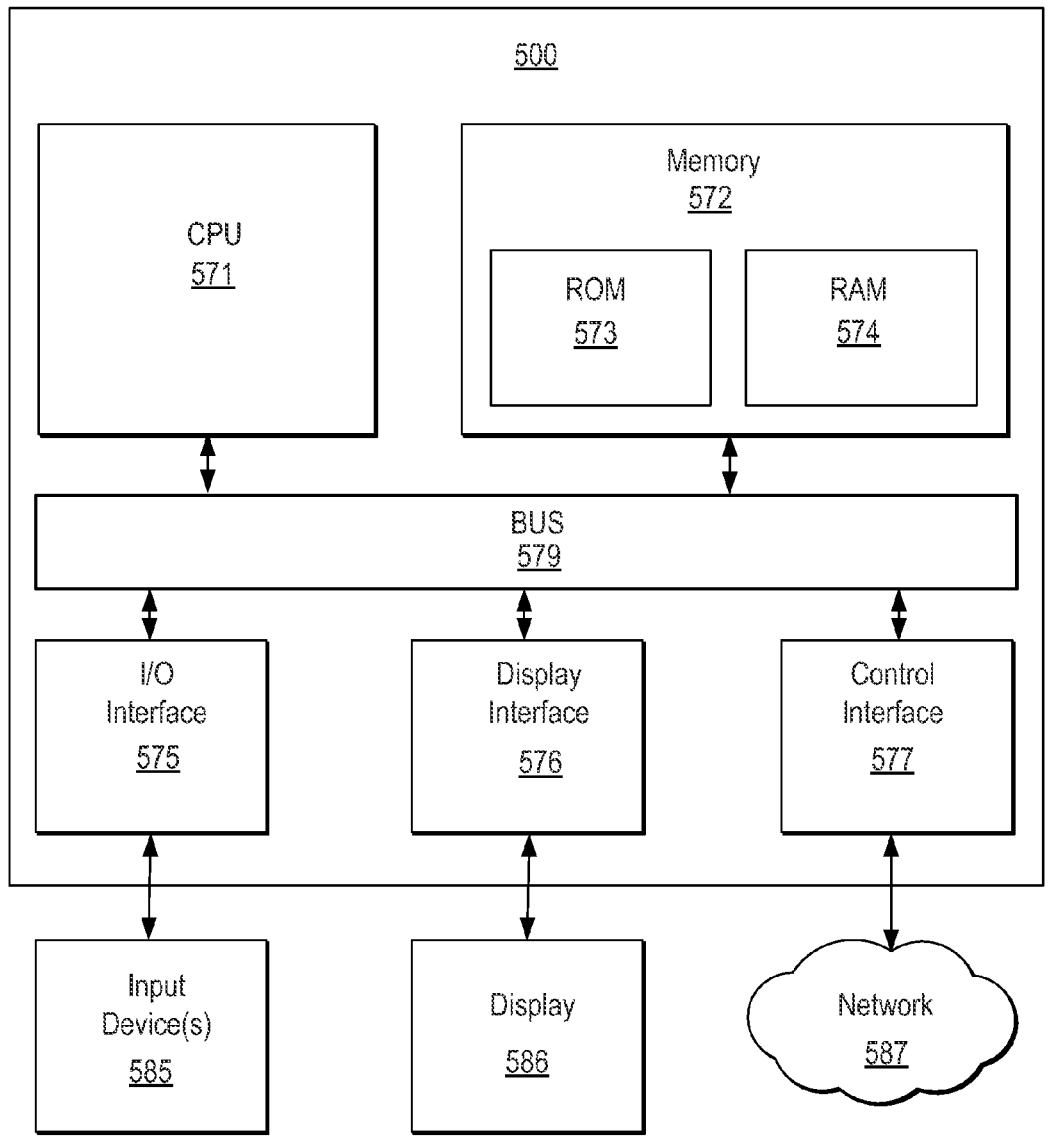
FIG. 5 is a functional block diagram illustrating a computer system 500, for executing an algorithm to control operations of phase noise extractor 10 of FIG. 1, according to a representative embodiment.

FIG. 5 is a functional block diagram illustrating a computer system 500, for executing an algorithm to control operations of phase noise extractor 10 of FIG. 1, according to a representative embodiment. The computer system 500 may be any type of computer processing device, such as a PC, capable of executing the various steps of the programming language translation process. In various embodiments, the computer system 500 may be included in a receiver, an analyzer or a tester, and/or a separate controller or other processing device (not shown), or may be distributed among one or more of these devices.

In the depicted representative embodiment, the computer system 500 includes central processing unit (CPU) 571, memory 572, bus 579 and interfaces 575-577. Memory 572 includes at least nonvolatile read only memory (ROM) 573 and volatile random access memory (RAM) 574, although it is understood that memory 572 may be implemented as any number, type and combination of ROM and RAM and of internal and external memory. Memory 572 may provide look-up tables and/or other relational functionality. In various embodiments, the memory 572 may include any number, type and combination of tangible, non-transitory computer readable storage media, such as a disk drive, compact disc (e.g., CD-R/CD/RW), electrically programmable read-only memory (EPROM), electrically erasable and programmable read only memory (EEPROM), digital video disc (DVD), universal serial bus (USB) drive, diskette, floppy disk, and the like. Further, the memory 572 may store program instructions and results of calculations performed by CPU 571.

The CPU 571 is configured to execute one or more software algorithms, including control of phase noise extractor 10 according to various embodiments described herein, e.g., in conjunction with memory 572. The CPU 571 may include its own memory (e.g., nonvolatile memory) for storing executable software code that allows it to perform the various functions. Alternatively, the executable code may be stored in designated memory locations within memory 572. The CPU 571 may execute an operating system, such as Windows® operating systems available from Microsoft Corporation or Unix operating systems (e.g., Solaris™ available from Sun Microsystems, Inc.), and the like.

In a representative embodiment, a user and/or other computers may interact with the computer system 500 using input device(s) 585 through I/O interface 575. The input device(s) 585 may include any type of input device, for example, a keyboard, a track ball, a mouse, a touch pad or touch-sensitive display, and the like. Also, information may be displayed by the computer system 500 on display 586 through display interface 576, which may include any type of graphical user interface (GUI), for example.

The computer system 500 may also include a control interface 577 for communicating with various components of phase noise extractor 10 shown in FIG. 1. For example, in various embodiments, the computer system 500 may communicate via a wired or wireless LAN, for example, as indicated by network 587, and may control switches 106 and 112, the sampling rate of ADC 104, and frequency transformer 116. Computer system 500 may control selection of modulation format, data capture length, start timing triggering, RF frequency and IF bandwidth filtering. The control interface 577 may include, for example, a transceiver (not shown), including a receiver and a transmitter, that communicates wirelessly over a data network through an antenna system (not shown), according to appropriate standard protocols. However, it is understood that the control interface 577 may include any type of interface, without departing from the scope of the present teachings.

In a representative embodiment, computer system 500 may carry out the functionality of phase noise extractor 10. Computer system 500 may thus be configured to carry out all or part of the functionality of phase noise extractor 10 using program instructions which may be stored as code segment in any number, type and combination of the above noted tangible computer readable storage media or non-transitory computer readable medium. Phase noise extractor 10 may thus be virtually implemented.

The various "parts" shown in the computer system 500 may be physically implemented using a software-controlled microprocessor, hard-wired logic circuits, or a combination thereof. Also, while the parts are functionally segregated in the computer system 500 for explanation purposes, they may be combined variously in any physical implementation. In a farther representative embodiment, computer system 500 may be configured somewhat similarly as described above for executing an algorithm to control operation of phase noise extractor 30 shown in FIG. 4.

In a still further representative embodiment, either of phase noise extractors 10 and 30 may be used to respectively provide a power spectrum of amplitude noise induced by a component of transmitter 20, such as oscillator 210. Under conditions that the RF signal received from transmitter 20 is dominated by amplitude noise instead of phase noise at all offset frequencies of interest, phase noise extractors 10 and 30 extract amplitude noise. Consequently, the correlated noise signal $c_y(k)$ is dominated by amplitude noise, whereby frequency transformers 116 and 316 obtain the power spectrum of the amplitude noise as $P(\omega)$.

While specific embodiments are disclosed herein, many variations are possible, which remain within the concept and scope of the present teachings. Such variations would be apparent in view of the specification, drawings and claims herein. For example, in an embodiment baseband signals may be input to phase noise extractors 10 and 30 of FIGS. 1 and 4 instead of RF signals. In such an embodiment, down-converters 102, 302 and 322 may be omitted from phase noise extractors 10 and 30, in a further embodiment, discrete-time inputs may be provided as input to phase noise extractors 10 and 30 of FIGS. 1 and 4 instead of RF signals. In such a further embodiment, down-converters 102, 302 and 322 and A/D converters (ADCs) 104, 304 and 324 may be omitted from phase noise extractors 10 and 30. Also, if the total power of pure phase noise is all that is to be measured, frequency transformers 116 and 316 may be omitted from phase noise extractors 10 and 30.

What is claimed is:

1. A method comprising:
digitizing a radio frequency (RF) signal that includes phase noise and secondary noise;
removing modulation and suppressing a carrier represented in the digitized signal to provide a composite noise signal including the phase noise and the secondary noise;
applying a complementary autocorrelation on the composite noise signal to attenuate the secondary noise and provide a correlated noise signal substantially without the secondary noise; and
representing a power spectrum of the phase noise responsive to the correlated noise signal.

2. The method of claim 1, further comprising suppressing the carrier represented in the digitized signal to provide the composite noise signal when the received RF signal is not modulated.

3. The method of claim 1, further comprising down-converting the RF signal to baseband prior to said digitizing.

4. The method of claim 1, wherein the secondary noise comprises any of thermal noise, additive spurious signals, modulation-induced noise, or synchronization-induced noise.

5. The method of claim 4, wherein the synchronization-induced noise is induced during removing of the modulation or suppressing of the carrier.

6. The method of claim 1, wherein the phase noise is induced by an oscillator of the transmitter.

7. An apparatus comprising:
a converter configured to digitize a radio frequency (RF) signal that includes phase noise and secondary noise;
a processing unit configured to remove modulation and suppress a carrier represented in the digitized signal to provide a composite noise signal including the phase noise and the secondary noise;
a correlator configured to apply a complementary autocorrelation on the composite noise signal to attenuate the secondary noise and provide a correlated noise signal substantially without the secondary noise; and
a generator configured to represent a power spectrum of the phase noise responsive to the correlated noise signal.

8. The apparatus of claim 7, wherein said processing unit is further configured to suppress the carrier represented in the digitized signal to provide the composite noise signal when the RF signal is not modulated.

9. The apparatus of claim 7, further comprising a down-converter configured to convert the RF signal to baseband prior to digitizing by said converter.

10. The apparatus of claim 7, wherein the secondary noise comprises any of thermal noise, additive spurious signals, modulation-induced noise, or synchronization-induced noise.

11. The apparatus of claim 10, wherein the synchronization-induced noise is induced by the processing unit.

12. The apparatus of claim 8, wherein the phase noise is induced by an oscillator of the transmitter.

13. A non-transitory computer readable medium that stores a program executable by a computer for extracting phase noise from a radio frequency (RF) signal, the computer readable medium comprising:
a first code segment for digitizing the RF signal that includes the phase noise and secondary noise;
a second code segment for removing modulation and suppressing a carrier represented in the digitized signal to provide a composite noise signal including the phase noise and the secondary noise;
a third code segment for applying a complementary autocorrelation on the composite noise signal to attenuate the secondary noise and provide a correlation noise signal substantially without the secondary noise; and a fourth code segment for representing a power spectrum of the phase noise responsive to the correlated noise signal.

14. The computer readable medium of claim 13, further comprising a fifth code segment for suppressing the carrier represented in the digitized signal to provide the composite noise signal when the RF signal is not modulated.

15. The computer readable medium of claim 13, wherein the secondary noise comprises any of thermal noise, additive spurious signals, modulation-induced noise, or synchronization-induced noise.

16. The computer readable medium of claim 15, wherein the synchronization-induced noise is induced by removing the modulation or suppressing the carrier.

17. The computer readable medium of claim 13, wherein the phase noise is induced by an oscillator of a transmitter.

18. An apparatus comprising:
 a converter configured to digitize a first radio frequency (RF) signal and a second RF signal that both include phase noise and secondary noise;
 a processing unit configured to remove modulation and suppress carriers represented in the first and second digitized signals to respectively provide a first composite noise signal and a second composite noise signal both including the phase noise and the secondary noise;
 a correlator configured to apply a complementary cross-correlation on the first and second composite noise signals to attenuate the secondary noise, and provide a correlated noise signal substantially without the secondary noise; and
 a generator configured to represent a power spectrum of the phase noise responsive to the correlated noise signal.

19. The apparatus of claim 18, wherein said processing unit is further configured to suppress carriers represented in the first and second digitized signals to respectively provide the first and second composite noise signals when the first and second RF signals are not modulated.

20. The apparatus of claim 18, wherein the phase noise is induced by an oscillator of the transmitter.

21. A method comprising:
 digitizing a radio frequency (RF) signal that includes amplitude noise and secondary noise;
 removing modulation and suppressing a carrier represented in the digitized signal to provide a composite noise signal including the amplitude noise and the secondary noise;
 applying a complementary autocorrelation on the composite noise signal to attenuate the secondary noise and provide a correlated noise signal substantially without the secondary noise; and
 representing a power spectrum of the amplitude noise responsive to the correlated noise signal.

22. The method of claim 21, wherein the secondary noise comprises any of thermal noise, additive spurious signals, modulation-induced noise, or synchronization-induced noise.

23. The method of claim 21, wherein the amplitude noise is induced by an amplifier of the transmitter.

* * * * *